US011324020B2

United States Patent
Yu et al.

(10) Patent No.: US 11,324,020 B2
(45) Date of Patent: May 3, 2022

(54) DATA SCHEDULING AND TRANSMISSION FOR DIFFERENT LOGICAL CHANNELS

(71) Applicant: Huawei Technologies Co., Ltd., Shenzhen (CN)

(72) Inventors: Haifeng Yu, Beijing (CN); Xin Xiong, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 16/530,622

(22) Filed: Aug. 2, 2019

(65) Prior Publication Data

US 2019/0357237 A1    Nov. 21, 2019

Related U.S. Application Data

(63) Continuation of application No. PCT/CN2018/074713, filed on Jan. 31, 2018.

(30) Foreign Application Priority Data

Feb. 4, 2017    (CN) .......................... 201710064422.9

(51) Int. Cl.
*H04W 72/12*    (2009.01)
*H04W 76/27*    (2018.01)
(Continued)

(52) U.S. Cl.
CPC ....... *H04W 72/1242* (2013.01); *H04L 5/0082* (2013.01); *H04L 5/0094* (2013.01);
(Continued)

(58) Field of Classification Search
CPC . H04W 72/1242; H04W 76/27; H04W 76/10; H04W 28/0278; H04W 72/1263;
(Continued)

(56) References Cited

U.S. PATENT DOCUMENTS

2010/0322098 A1    12/2010    Pelletier et al.
2013/0107722 A1*    5/2013    Huang .................. H04W 28/12
                                                                370/241
(Continued)

FOREIGN PATENT DOCUMENTS

CN    103313396 A    9/2013
CN    104754524 A    7/2015
(Continued)

OTHER PUBLICATIONS

3GPP TR 38.913 V14.1.0 (Dec. 2016); 3rd Generation Partnership Project; Technical Specification Group Radio Access Network; Study on Scenarios and Requirements for Next Generation Access Technologies; (Release 14); 38 pages.
(Continued)

*Primary Examiner* — Ian N Moore
*Assistant Examiner* — Brian T Le
(74) *Attorney, Agent, or Firm* — Slater Matsil, LLP

(57) ABSTRACT

This application provides a resource scheduling method, an apparatus, and a system, and relates to the field of communications technologies, to meet scheduling requirements of data transmitted on different logical channels. The method includes: sending, by a terminal device, a BSR to an access network device, where the BSR carries first indication information, and the first indication information is used by the access network device to determine a scheduling mode corresponding to a first logical channel; receiving, by the terminal device, a first uplink grant resource sent by the access network device, where the first uplink grant resource is scheduled by the access network device based on the BSR in the scheduling mode; and sending, by the terminal device, to-be-sent data on the first logical channel to the access network device by using the first uplink grant resource.

18 Claims, 6 Drawing Sheets

(51) Int. Cl.
  *H04L 5/00* (2006.01)
  *H04W 28/02* (2009.01)
  *H04W 72/14* (2009.01)

(52) U.S. Cl.
  CPC ... *H04W 28/0278* (2013.01); *H04W 72/1263* (2013.01); *H04W 72/14* (2013.01); *H04W 76/27* (2018.02)

(58) Field of Classification Search
  CPC .... H04W 72/14; H04W 28/12; H04L 5/0082; H04L 5/0094
  See application file for complete search history.

(56) References Cited

U.S. PATENT DOCUMENTS

2016/0007229 A1   1/2016  Gao et al.
2017/0170937 A1\*  6/2017  Chun .................... H04L 5/0094

FOREIGN PATENT DOCUMENTS

| EP | 2197235 A2 | 6/2010 |
|---|---|---|
| EP | 3125643 A1 | 2/2017 |
| WO | 2014139083 A1 | 9/2014 |
| WO | 2016119160 A1 | 8/2016 |

OTHER PUBLICATIONS

Asustek, "Discussion on SR and BSR in NR"; 3GPP TSG-RAN WG2 Meeting #97, Athens, Greece, Feb. 13-17, 2017, (resubmission of R2-1700354); Agenda Item: 10.2.1.4, 4 pages.

\* cited by examiner

DATA SCHEDULING AND TRANSMISSION FOR DIFFERENT LOGICAL CHANNELS

CROSS-REFERENCE TO RELATED APPLICATIONS

This application is a continuation of International Application No. PCT/CN2018/074713, filed on Jan. 31, 2018, which claims priority to Chinese Patent Application No. 201710064422.9, filed on Feb. 4, 2017. The disclosures of the aforementioned applications are hereby incorporated by reference in their entireties.

TECHNICAL FIELD

This application relates to the field of communications technologies, and in particular, to a resource scheduling method, an apparatus, and a system.

BACKGROUND

In a long term evolution (LTE) system, when user equipment (UE) needs to send uplink data, the UE needs to request a base station to schedule a resource. A resource scheduling procedure may usually include: The UE first sends a scheduling request (SR) to the base station, to notify the base station that the UE needs an uplink grant resource. After receiving the SR, the base station sends an uplink grant to the UE. After receiving the uplink grant, the UE sends a buffer status report (BSR) to the base station on a resource indicated by the uplink grant, to notify the base station of a specific volume of uplink data that the UE needs to send. After receiving the BSR, the base station may allocate an uplink grant resource to the uplink data based on the uplink data volume that is indicated by the BSR and a preset scheduling algorithm, and re-send an uplink grant to the UE, to indicate the uplink grant resource. Further, the UE may send the uplink data on the uplink grant resource indicated by the uplink grant.

Usually, the base station receives, at a same moment, BSRs sent by a plurality of UEs, and the base station sequentially allocates, according to a first come first service rule, uplink grant resources required by UEs, and sequentially sends the allocated uplink grant resources to corresponding UEs, causing a scheduling latency. However, data transmitted on different logical channels may have different scheduling requirements. If the foregoing resource scheduling mode is used, the base station probably cannot meet the different scheduling requirements. For example, data transmitted on some logical channels, which is new radio (NR) data in a 5G network, has a strict latency requirement. This requires that the base station quickly schedule an uplink grant resource. If the base station still uses the foregoing resource scheduling method, the UE probably cannot obtain an uplink grant resource in time. Consequently, low-latency scheduling requirements of the NR data transmitted on these logical channels are not met.

SUMMARY

This application provides a resource scheduling method, an apparatus, and a system, to meet scheduling requirements of data transmitted on different logical channels.

According to a first aspect, this application provides a resource scheduling method. The method includes: sending, by a terminal device, a BSR to an access network device, where the BSR carries first indication information, and the first indication information is used by the access network device to determine a scheduling mode corresponding to a first logical channel; receiving, by the terminal device, a first uplink grant resource sent by the access network device, where the first uplink grant resource is scheduled by the access network device based on the BSR in the scheduling mode; and sending, by the terminal device, to-be-sent data on the first logical channel to the access network device by using the first uplink grant resource.

According to the resource scheduling method provided in this application, the terminal device adds the first indication information to the BSR, to instruct the access network device to determine the scheduling mode corresponding to the first logical channel. Therefore, after receiving the BSR, the access network device schedules, in the scheduling mode corresponding to the first logical channel, the first uplink grant resource required by the to-be-sent data on the first logical channel, to differentially schedule the first uplink grant resource required by the to-be-sent data on the first logical channel, thereby meeting a scheduling requirement of the to-be-sent data.

In a possible design, before the sending, by a terminal device, a BSR to an access network device, the method further includes: receiving, by the terminal device, information that is about a mapping relationship between transmission characteristic information and the logical channel and that is sent by the access network device, where the mapping relationship is used to configure a transmission characteristic corresponding to the first logical channel, and the first indication information includes the transmission characteristic information.

In a possible design, the BSR is a BSR corresponding to the first logical channel, and before the sending, by a terminal device, a BSR to an access network device, the method further includes: receiving, by the terminal device, a radio resource control (RRC) connection reconfiguration message sent by the access network device, where the RRC connection reconfiguration message includes configuration information used to individually report the BSR for the first logical channel; and individually generating, by the terminal device, the BSR for the first logical channel based on the configuration information.

In this possible design, the access network device configures the configuration information used to individually report the BSR for the first logical channel, and sends the configuration information to the terminal device, so that the terminal device can individually report the BSR corresponding to the first logical channel, the access network device can individually schedule the first uplink grant resource for the to-be-sent data on the first logical channel, and the terminal device can directly receive and use the first uplink grant resource, without determining the first uplink grant resource in a total resource allocated to the LCG, thereby further reducing a latency of obtaining the first uplink grant resource by the terminal device.

In a possible design, the BSR is a BSR corresponding to an LCG to which the first logical channel belongs, and the BSR further carries data volume information of the to-be-sent data.

In a possible design, to-be-sent uplink data on the LCG includes the to-be-sent data, and the data volume information is a ratio of the to-be-sent data to the uplink data.

In the foregoing two possible designs, the terminal device adds the data volume information of the to-be-sent data on the first logical channel to the BSR, so that the access network device can individually schedule, for the to-be-sent data based on the data volume information, the first uplink grant resource required by the to-be-sent data, and the terminal device can also individually obtain the first uplink grant resource, without individually sending the BSR corresponding to the first logical channel to the access network device, thereby reducing network overheads. In addition, the terminal device individually obtains the first uplink grant resource, thereby further reducing a latency of obtaining the first uplink grant resource by the terminal device.

In a possible design, the BSR is a BSR corresponding to an LCG to which the first logical channel belongs, and the receiving, by the terminal device, a first uplink grant resource sent by the access network device includes: receiving, by the terminal device, a second uplink grant resource sent by the access network device, where the second uplink grant resource is a total resource allocated by the access network device to to-be-sent uplink data on the LCG based on the BSR, the uplink data includes the to-be-sent data, and the second uplink grant resource includes the first uplink grant resource; and the sending, by the terminal device, the to-be-sent data to the access network device by using the first uplink grant resource includes: determining, by the terminal device, the first uplink grant resource in the second uplink grant resource, and sending the to-be-sent data to the access network device by using the first uplink grant resource.

According to a second aspect, this application provides a resource scheduling method. The method includes: receiving, by an access network device, a BSR sent by a terminal device, where the BSR carries first indication information, and the first indication information is used by the access network device to determine a scheduling mode corresponding to a first logical channel; determining, by the access network device, the scheduling mode according to the first indication information; and scheduling, by the access network device, a first uplink grant resource based on the BSR in the scheduling mode, where the first uplink grant resource is used to send to-be-sent data on the first logical channel.

According to the resource scheduling method provided in this application, after receiving the BSR sent by the terminal device, the access network device may determine, according to the first indication information carried in the BSR, the scheduling mode corresponding to the first logical channel. The first uplink grant resource required by the to-be-sent data on the first logical channel is scheduled in the scheduling mode corresponding to the first logical channel, to differentially schedule the first uplink grant resource required by the to-be-sent data on the first logical channel, thereby meeting a scheduling requirement of the to-be-sent data. In a possible design, before the receiving, by an access network device, a BSR sent by a terminal device, the method further includes: sending, by the access network device, information about a mapping relationship between transmission characteristic information and the first logical channel to the terminal device, where the mapping relationship is used to configure a transmission characteristic corresponding to the first logical channel, and the first indication information includes the transmission characteristic information.

In a possible design, the BSR is a BSR corresponding to the first logical channel, and before the receiving, by an access network device, a BSR sent by a terminal device, the method further includes: configuring, by the access network device in a radio resource control RRC connection reconfiguration message, configuration information used to individually report the BSR for the first logical channel; and sending, by the access network device, the RRC connection reconfiguration message to the terminal device.

In this possible design, the access network device configures the configuration information used to individually report the BSR for the first logical channel, and sends the configuration information to the terminal device, so that the terminal device can individually report the BSR corresponding to the first logical channel, the access network device can individually schedule the first uplink grant resource for the to-be-sent data on the first logical channel, and the terminal device can directly receive and use the first uplink grant resource, without determining the first uplink grant resource in a total resource allocated to the LCG, thereby further reducing a latency of obtaining the first uplink grant resource by the terminal device.

In a possible design, the first logical channel is a logical channel whose priority level is higher than a preset threshold level; and the scheduling, by the access network device, a first uplink grant resource based on the BSR in the scheduling mode includes: preferentially allocating, by the access network device, the first uplink grant resource to the to-be-sent data based on the BSR, and sending the first uplink grant resource to the terminal device in the scheduling mode; or allocating, by the access network device, the first uplink grant resource to the to-be-sent data based on the BSR, and preferentially sending the first uplink grant resource to the terminal device in the scheduling mode; or preferentially allocating, by the access network device, the first uplink grant resource to the to-be-sent data based on the BSR, and preferentially sending the first uplink grant resource to the terminal device in the scheduling mode.

In this possible design, in a process of scheduling a corresponding uplink grant resource based on each BSR, the access network device can preferentially allocate and/or preferentially send the first uplink grant resource, to reduce a scheduling latency of the first uplink grant resource, thereby meeting a low-latency scheduling requirement of the to-be-sent data on the first logical channel.

In a possible design, the first logical channel is a logical channel whose priority level is higher than a preset threshold level, the BSR is a BSR corresponding to a logical channel group (LCG) to which the first logical channel belongs, and the BSR further carries a data volume of the to-be-sent data; and the scheduling, by the access network device, a first uplink grant resource based on the BSR in the scheduling mode includes: preferentially allocating, by the access network device, the first uplink grant resource to the to-be-sent data individually based on the data volume of the to-be-sent data, and sending the first uplink grant resource to the terminal device in the scheduling mode; or individually allocating, by the access network device, the first uplink grant resource to the to-be-sent data based on the data volume of the to-be-sent data, and preferentially sending the first uplink grant resource to the terminal device in the scheduling mode; or preferentially allocating, by the access network device, the first uplink grant resource to the to-be-sent data individually based on the data volume of the to-be-sent data, and preferentially sending the first uplink grant resource to the terminal device in the scheduling mode.

In this possible design, the access network device can separately schedule the first uplink grant resource required by the data volume of the to-be-sent data on the first logical channel in the LCG and an uplink grant resource required by a data volume of to-be-sent data on another logical channel, and preferentially allocate and/or preferentially send the first uplink grant resource, to reduce a scheduling latency of the first uplink grant resource, thereby meeting a low-latency scheduling requirement of the to-be-sent data on the first logical channel.

In a possible design, the first logical channel is a logical channel whose priority level is higher than a preset threshold level, and the BSR is a BSR corresponding to an LCG to which the first logical channel belongs; and the scheduling, by the access network device, a first uplink grant resource based on the BSR in the scheduling mode includes: preferentially allocating, by the access network device, a second transmission resource to to-be-sent uplink data on the LCG based on the BSR, and sending the second uplink grant resource to the terminal device in the scheduling mode; or allocating, by the access network device, a second uplink grant resource to the uplink data based on the BSR, and preferentially sending the second uplink grant resource to the terminal device in the scheduling mode; or preferentially allocating, by the access network device, a second uplink grant resource to the uplink data based on the BSR, and preferentially sending the second uplink grant resource to the terminal device in the scheduling mode, where the uplink data includes the to-be-sent data, and the second uplink grant resource includes the first uplink grant resource.

In this possible design, in a process of scheduling a corresponding uplink grant resource based on each BSR, the access network device can preferentially allocate and/or preferentially send the second uplink grant resource, to reduce a scheduling latency of the second uplink grant resource, thereby meeting a low-latency scheduling requirement of the to-be-sent data on the first logical channel.

According to a third aspect, this application provides a terminal device, including: a processing unit, configured to generate a BSR, where the BSR carries first indication information, and the first indication information is used by the access network device to determine a scheduling mode corresponding to a first logical channel; a sending unit, configured to send the BSR to the access network device; and a receiving unit, configured to receive a first uplink grant resource sent by the access network device, where the first uplink grant resource is scheduled by the access network device based on the BSR in the scheduling mode, where the sending unit is further configured to send to-be-sent data to the access network device by using the first uplink grant resource received by the receiving unit.

In a possible design, the receiving unit is further configured to: before the sending unit sends the BSR to the access network device, receive information that is about a mapping relationship between transmission characteristic information and the logical channel and that is sent by the access network device, where the mapping relationship is used to configure a transmission characteristic corresponding to the first logical channel, and the first indication information includes the transmission characteristic information.

In a possible design, the BSR is a BSR corresponding to the first logical channel; and the receiving unit is further configured to: before the sending unit sends the BSR to the access network device, receive an RRC connection reconfiguration message sent by the access network device, where the RRC connection reconfiguration message includes configuration information used to individually report the BSR for the first logical channel; and the generation unit is specifically configured to individually generate the BSR for the first logical channel based on the configuration information.

In a possible design, the BSR is a BSR corresponding to an LCG to which the first logical channel belongs, and the BSR further carries data volume information of the to-be-sent data.

In a possible design, to-be-sent uplink data on the LCG includes the to-be-sent data, and the data volume information is a ratio of the to-be-sent data to the uplink data.

In a possible design, the BSR is a BSR corresponding to an LCG to which the first logical channel belongs; that the receiving unit receives a first uplink grant resource sent by the access network device specifically includes: receiving a second uplink grant resource sent by the access network device, where the second uplink grant resource is a total resource allocated by the access network device to to-be-sent uplink data on the LCG based on the BSR, the uplink data includes the to-be-sent data, and the second uplink grant resource includes the first uplink grant resource; and that the sending unit sends the to-be-sent data to the access network device by using the first uplink grant resource specifically includes: determining the first uplink grant resource in the second uplink grant resource, and sending the to-be-sent data to the access network device by using the first uplink grant resource.

For a technical effect of the terminal device provided in this application, refer to a technical effect of the first aspect or the implementations of the first aspect. Details are not described herein again.

According to a fourth aspect, this application provides an access network device, including: a receiving unit, configured to receive a buffer status report (BSR) sent by a terminal device, where the BSR carries first indication information, and the first indication information is used by the access network device to determine a scheduling mode corresponding to a first logical channel; and a processing unit, configured to determine the scheduling mode according to the first indication information, where the processing unit is further configured to schedule a first uplink grant resource based on the BSR in the scheduling mode, where the first uplink grant resource is used to send the to-be-sent data.

In a possible design, the access network device further includes a sending unit; the sending unit is configured to: before the receiving unit receives the BSR sent by the terminal device, send information about a mapping relationship between transmission characteristic information and the first logical channel to the terminal device, where the mapping relationship is used to configure a transmission characteristic corresponding to the first logical channel, and the first indication information includes the transmission characteristic information.

In a possible design, the BSR is a BSR corresponding to the first logical channel, and the access network device further includes the sending unit; the processing unit is further configured to: before the receiving unit receives the BSR sent by the terminal device, configure, in a radio resource control RRC connection reconfiguration message, configuration information used to individually report the BSR for the first logical channel; and the sending unit is configured to send the RRC connection reconfiguration message to the terminal device.

In a possible design, the first logical channel is a logical channel whose priority level is higher than a preset threshold level; and that the processing unit schedules a first uplink grant resource based on the BSR in the scheduling mode corresponding to the first indication information specifically includes: preferentially allocating the first uplink grant resource to the to-be-sent data based on the BSR, and sending the first uplink grant resource to the terminal device in the scheduling mode; or allocating the first uplink grant resource to the to-be-sent data based on the BSR, and preferentially sending the first uplink grant resource to the terminal device in the scheduling mode; or preferentially allocating the first uplink grant resource to the to-be-sent data based on the BSR, and preferentially sending the first uplink grant resource to the terminal device in the scheduling mode.

In a possible design, the first logical channel is a logical channel whose priority level is higher than a preset threshold level, the BSR is a BSR corresponding to an LCG to which the first logical channel belongs, and the BSR further carries a data volume of the to-be-sent data; and that the processing unit schedules a first uplink grant resource based on the BSR in the scheduling mode specifically includes: preferentially allocating the first uplink grant resource to the to-be-sent data individually based on the data volume of the to-be-sent data, and sending the first uplink grant resource to the terminal device in the scheduling mode; or individually allocating the first uplink grant resource to the to-be-sent data based on the data volume of the to-be-sent data, and preferentially sending the first uplink grant resource to the terminal device in the scheduling mode; or preferentially allocating the first uplink grant resource to the to-be-sent data individually based on the data volume of the to-be-sent data, and preferentially sending the first uplink grant resource to the terminal device in the scheduling mode.

In a possible design, the first logical channel is a logical channel whose priority level is higher than a preset threshold level; the BSR is a BSR corresponding to an LCG to which the first logical channel belongs; and that the processing unit schedules a first uplink grant resource based on the BSR in the scheduling mode specifically includes: preferentially allocating a second transmission resource to to-be-sent uplink data on the LCG based on the BSR, and sending the second uplink grant resource to the terminal device in the scheduling mode; or allocating a second uplink grant resource to the uplink data based on the BSR, and preferentially sending the second uplink grant resource to the terminal device in the scheduling mode; or preferentially allocating a second uplink grant resource to the uplink data based on the BSR, and preferentially sending the second uplink grant resource to the terminal device in the scheduling mode, where the uplink data includes the to-be-sent data, and the second uplink grant resource includes the first uplink grant resource.

For a technical effect of the access network device provided in this application, refer to a technical effect of the second aspect or the implementations of the second aspect. Details are not described herein again.

With reference to any one of the first aspect to the fourth aspect, in a possible design, the first indication information includes priority information of the first logical channel.

With reference to any one of the first aspect to the fourth aspect, in a possible design, the transmission characteristic information includes at least one type of information of a transmission time interval, a subcarrier spacing, and a cyclic prefix length.

According to a fifth aspect, this application further provides a terminal device, including: a processor, a memory, and a transceiver, where the processor may execute a program or an instruction stored in the memory, to implement the resource scheduling method according to the implementations of the first aspect.

For a technical effect of the terminal device provided in this application, refer to a technical effect of the first aspect or the implementations of the first aspect. Details are not described herein again.

According to a sixth aspect, this application further provides an access network device, including: a processor, a memory, and a transceiver, where the processor may execute a program or an instruction stored in the memory, to implement the resource scheduling method according to the implementations of the second aspect.

For a technical effect of the access network device provided in this application, refer to a technical effect of the second aspect or the implementations of the second aspect. Details are not described herein again.

According to a seventh aspect, this application further provides a storage medium. The computer storage medium may store a program, and when the program is executed, some or all steps of embodiments of the resource scheduling method provided in this application may be implemented.

According to an eighth aspect, this application further provides a communications system, including the terminal device according to any one of the third aspect or the implementations of the third aspect and the access network device according to any one of the fourth aspect or the implementations of the fourth aspect; or including the terminal device according to any one of the fifth aspect or the implementations of the fifth aspect and the access network device according to any one of the sixth aspect or the implementations of the sixth aspect.

DETAILED DESCRIPTION OF ILLUSTRATIVE EMBODIMENTS

First, the terms "system" and "network" in this specification may be used interchangeably in this specification. The character "/" in this specification generally indicates an "or" relationship between the associated objects. The term "and/or" in this specification describes only an association relationship for describing associated objects and represents that three relationships may exist. For example, A and/or B may represent the following three cases: Only A exists, both A and B exist, and only B exists.

In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In addition, a resource scheduling method provided in this application is applicable to an LTE system, a long term evolution advanced (LTE advanced, LTE-A) system, or other wireless communications systems using various radio access technologies, for example, systems using access technologies such as code division multiple access, frequency division multiple access, time division multiple access, orthogonal frequency division multiple access, and single carrier frequency division multiple access. In addition, the resource scheduling method is further applicable to a subsequent evolved system of the LTE system, for example, a fifth generation 5G system.

Figure 1:
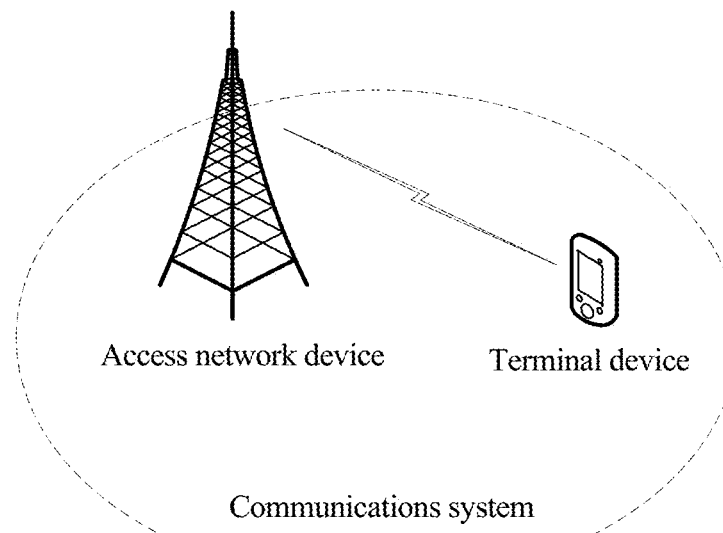
FIG. 1 is a block diagram of a communications system according to this application.

As shown in FIG. 1, the resource scheduling method provided in this application may be applied to a communications system including an access network device and at least one terminal device. The terminal device in this application may include various handheld devices, a vehicle-mounted device, a wearable device, or a computing device having a wireless communication function, or another processing device connected to a wireless modem, a communications node on a household appliance, a medical device, an industrial device, an agricultural device, an aeronautical device, or the like, various forms of user equipment UE), a mobile station (MS), a terminal, or terminal equipment, and the like. For ease of description, in this application, the devices mentioned above are collectively referred to as a terminal device.

An access network device in this application may be an apparatus deployed in a radio access network and configured to provide a wireless communication function for the terminal device, for example, may be a base station (BS), including various forms of macro base stations, micro base stations, relay nodes, controllers, access points, and the like. In systems using different radio access technologies, names of devices having a function of the base station may vary. For example, in an LTE network, the device is referred to as an evolved NodeB (eNB or eNodeB), and in a third generation 3G network, the device is referred to as a NodeB, or a communications node applied to a fifth generation communications system or D2D communications. The access network device may be another similar access network device. The access network device may alternatively be a transmission and reception point (TRP), and a structure of the TRP may be a structure of a base station, or may be a structure including a remote radio unit (RRU), a building baseband processing unit (BBU), and an antenna system, or may be a structure including only a radio frequency system and an antenna system.

Figure 2:
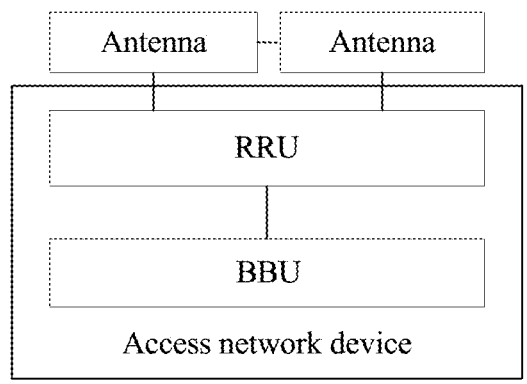
FIG. 2 is a first schematic structural diagram of an access network device according to this application.

For example, FIG. 2 is a schematic structural diagram of an access network device according to this application. The access network device may include an RRU, a BBU, and an antenna system.

The RRU includes a digital intermediate frequency module, a transceiver module, and a power amplification and filtering module. The digital intermediate frequency module is configured to perform modulation and demodulation, digital up- and down-frequency conversion, A/D conversion, and the like in optical transmission. The transceiver module converts an intermediate frequency signal into a radio frequency signal, and then the radio frequency signal passes through the power amplification and filtering module, and is transmitted through an antenna port. The BBU is configured to implement functions such as channel coding and decoding, modulation and demodulation of a baseband signal, and protocol processing, also provides an interface function with an upper layer network element, and completes a core technology processing process at a physical layer, for example, CDMA processing in 3G and OFDM/MIMO processing in LTE. The antenna system mainly includes an antenna, and may further include a coupler, a duplexer, and the like, and is configured to transmit data between the RRU and another network element, such as a terminal device.

Figure 3:
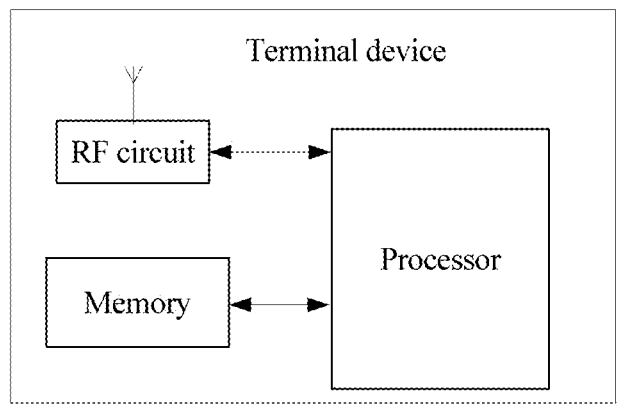
FIG. 3 is a first schematic structural diagram of a terminal device according to this application.

FIG. 3 is a schematic structural diagram of a terminal device according to this application. The terminal device includes a processor, a memory, an RF circuit, and the like.

The processor is a control center of the terminal device and is connected to all parts of the entire terminal device by using various interfaces and lines. By running or executing a software program and/or a module stored in the memory, and invoking data stored in the memory, the processor performs various functions of the terminal device and processes data, to perform overall monitoring on the terminal device. The processor may include a digital signal processor device, a microprocessor device, an analog-to-digital converter, a digital-to-analog converter, and the like. These devices can implement control and signal processing functions of the terminal device based on capabilities of these devices. The RF circuit may be configured to send and receive information, and deliver received information to the processor for processing. Generally, the RF circuit includes but is not limited to an antenna, at least one amplifier, a transceiver, a coupler, a low noise amplifier (LNA), a duplexer, and the like, and communicates with a network and another device through wireless communication. The wireless communication may use any communication standard or protocol that includes but is not limited to a global system for mobile communications (GSM), a general packet radio service (GPRS), code division multiple access (CDMA), wideband code division multiple access (WCDMA), long term evolution (LTE), Wi-Fi or low-power Wi-Fi, a WLAN technology, and the like.

Figure 4:
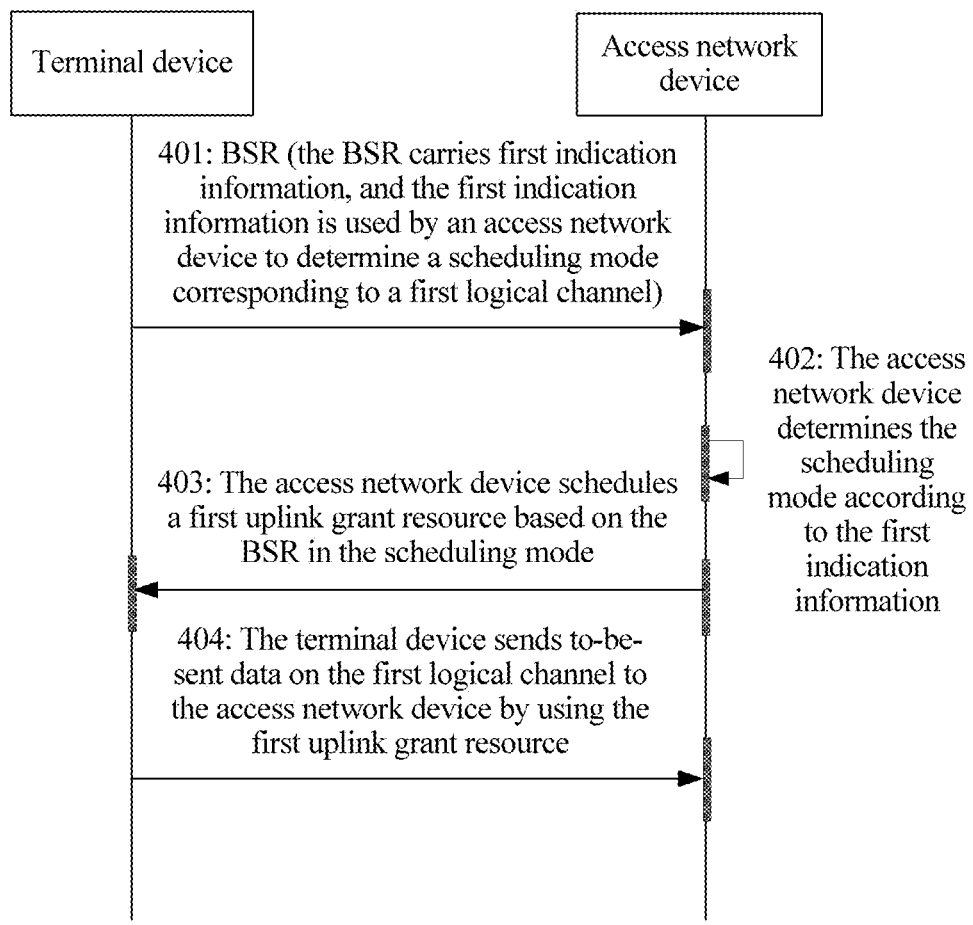
FIG. 4 is a flowchart of an embodiment of a resource scheduling method according to this application.

Based on the communications system shown in FIG. 1, FIG. 4 is a flowchart of an embodiment of a resource scheduling method according to this application. The method includes the following steps.

Step 401: A terminal device sends a BSR to an access network device, where the BSR carries first indication information, and the first indication information is used by the access network device to determine a scheduling mode corresponding to a first logical channel.

The first logical channel may be a logical channel whose priority level is higher than a preset threshold level, or a logical channel whose transmission time interval (TTI) is a preset time length, or a logical channel whose subcarrier spacing is a preset size, or the like.

Optionally, the first logical channel may be a logical channel for which a BSR can be individually reported.

Optionally, the first logical channel may be a logical channel bound to a service or a type of services, and is used to transmit data of a service bound to the first logical channel. For example, the first logical channel is a logical channel bound to an NR service, or a logical channel bound to a type of services whose priority level is higher than a preset threshold level, or a logical channel bound to a type of services having a low-latency scheduling requirement.

For example, the first indication information may be an identifier or a number of the first logical channel, or may be priority information of the first logical channel.

The priority information of the first logical channel may include priority level information of the first logical channel and/or priority level information of a service bound to the first logical channel.

Optionally, the first indication information may be transmission characteristic information of the first logical channel. The transmission characteristic information may include at least one type of information of a transmission time interval, a subcarrier spacing, and a cyclic prefix (CP) length. The subcarrier spacing and the CP length are also referred to as numerology information.

Further, the transmission characteristic information may further include, but is not limited to, a type of a radio resource, uplink-downlink subframe configurations in time division duplex (time division duplexing, TDD), a multiple access mode, a frame structure, a modulation and coding scheme, and the like.

In this application, the access network device may configure, by using a mapping relationship between the transmission characteristic information and the first logical channel, a transmission characteristic corresponding to the first logical channel, so that the terminal device can transmit to-be-sent data on the first logical channel by using the transmission characteristic.

For example, the access network device may add information about the mapping relationship to an RRC connection reconfiguration message, a physical downlink control channel (PDCCH) message, or a media access control (MAC) control element (CE), so that the terminal device determines the mapping relationship based on the information about the mapping relationship, and further, the terminal device can determine, based on the mapping relationship, the transmission characteristic indicated by the transmission characteristic information corresponding to the first logical channel.

When determining that there is the to-be-sent data on the first logical channel, the terminal device may add the transmission characteristic information, as the first indication information, to the BSR, and send the BSR to the access network device, so that the access network device determines, based on the transmission characteristic information, the scheduling mode corresponding to the first logical channel, and schedules, in the scheduling mode, an uplink grant resource required by the to-be-sent data.

Step 402: The access network device determines the scheduling mode according to the first indication information.

Step 403: The access network device schedules a first uplink grant resource based on the BSR in the scheduling mode, where the first uplink grant resource is used to send the to-be-sent data on the first logical channel.

Step 404: The terminal device sends the to-be-sent data to the access network device by using the first uplink grant resource.

In this application, the access network device determines, according to the first indication information carried in the BSR, the scheduling mode corresponding to the first logical channel. The first uplink grant resource required by the to-be-sent data is scheduled in the scheduling mode corresponding to the first logical channel, to differentially schedule the first uplink grant resource required by the to-be-sent data on the first logical channel, thereby meeting a scheduling requirement of the to-be-sent data.

The scheduling, by the access network device, a first uplink grant resource based on the BSR may include: allocating, by the access network device, the first uplink grant resource to the to-be-sent data based on the BSR, and sending the allocated uplink grant resource to the terminal device.

An example in which the first logical channel is a logical channel whose priority level is higher than the preset threshold level is used to describe step 403 with reference to the following three examples. The data transmitted on the first logical channel has a low-latency scheduling requirement.

Example 1: When the BSR is a BSR corresponding to the first logical channel, the BSR indicates a data volume of the to-be-sent data on the first logical channel. For example, in Example 1, the scheduling mode corresponding to the first logical channel and determined by the access network device according to the first indication information may be any one of the following three scheduling modes.

Scheduling mode 1: The access network device preferentially allocates the first uplink grant resource to the to-be-sent data based on the BSR, and sends the first uplink grant resource to the terminal device.

Scheduling mode 2: The access network device allocates the first uplink grant resource to the to-be-sent data based on the BSR, and preferentially sends the first uplink grant resource to the terminal device.

Scheduling mode 3: The access network device preferentially allocates the first uplink grant resource to the to-be-sent data based on the BSR, and preferentially sends the first uplink grant resource to the terminal device.

For example, it is assumed that a BSR 5 is the BSR sent by the terminal device and carrying the first indication information, and an uplink grant resource 5 allocated by the access network device based on the BSR 5 is the first uplink grant resource. Before receiving the BSR 5, the access network device already sequentially receives a BSR 1, a BSR 2, a BSR 3, and a BSR 4 in a chronological order, the access network device already allocates an uplink grant resource 1 based on the BSR 1, and the BSR 2, the BSR 3, and the BSR 4 are in a state of queuing up to be processed by the access network device.

If a scheduling mode determined by the access network device according to the first indication information is the scheduling mode 1, after the access network device receives the BSR 5, the access network device may arrange the BSR 5 in front of the BSR 2, the BSR 3, and the BSR 4, and preferentially allocate the uplink grant resource 5 based on the BSR 5 in the scheduling mode 1; and then sequentially allocate an uplink grant resource 2, an uplink grant resource 3, and an uplink grant resource 4 based on the BSR 2, the BSR 3, and the BSR 4, instead of arranging the BSR 5 behind the BSR 2, the BSR 3, and the BSR 4 according to a conventional first come first service rule for waiting to be processed by the access network device, thereby reducing a latency of scheduling the uplink grant resource 5 by the access network device.

After the uplink grant resource 5 is allocated, if the uplink grant resource 1 that is already allocated is still in a state of waiting to be sent by the access network device, the access network device may arrange the uplink grant resource 5 behind the uplink grant resource 1 according to the conventional first come first service rule for waiting to be sent by the access network device, and after sending the uplink grant resource 1, send the uplink grant resource 5 to the terminal device.

It may be understood that, if the BSR 2 also carries first indication information, and a scheduling mode determined by the access network device according to the first indication information is also the scheduling mode 1, the access network device needs to preferentially allocate the uplink grant resource 2 and the uplink grant resource 5, and then sequentially allocate the uplink grant resource 3 and the uplink grant resource 4.

For example, in a receiving order of the BSR 2 and the BSR 5, the access network device may first allocate the uplink grant resource 2 based on the BSR 2, and then allocate the uplink grant resource 5 based on the BSR 5.

Optionally, the access network device may allocate the uplink grant resource 2 and the uplink grant resource 5 in a priority level order of a logical channel 5 that is indicated by the first indication information in the BSR 5 and a logical channel 2 that is indicated by the first indication information in the BSR 2. For example, if a priority level of the logical channel 5 is higher than a priority level of the logical channel 2, the access network device may first allocate the uplink grant resource 5 based on the BSR 5, and then allocate the uplink grant resource 2 based on the BSR 2.

Optionally, the access network device may allocate the uplink grant resource 2 and the uplink grant resource 5 in a priority level order of a service bound to the logical channel 5 and a service bound to the logical channel 2.

It should be noted that, in the scheduling mode 1, the access network device can preferentially allocate the first uplink grant resource, thereby reducing a scheduling latency of the first grant resource, thereby meeting a low-latency scheduling requirement of the to-be-sent data on the first logical channel.

If a scheduling mode determined by the access network device according to the first indication information carried in the BSR 5 is the scheduling mode 2, after receiving the BSR 5, the access network device may first allocate an uplink grant resource 2, an uplink grant resource 3, and an uplink grant resource 4 based on the BSR 2, the BSR 3, and the BSR 4 and then allocate the uplink grant resource 5 based on the BSR 5 according to a conventional first come first service rule in the scheduling mode 2.

After the uplink grant resource 5 is allocated, if the uplink grant resource 1, the uplink grant resource 2, the uplink grant resource 3, and the uplink grant resource 4 that are already allocated are still in a state of waiting to be sent by the access network device, the access network device may arrange the uplink grant resource 5 in front of the uplink grant resource 1, the uplink grant resource 2, the uplink grant resource 3, and the uplink grant resource 4, and preferentially send the uplink grant resource 5, instead of sending the uplink grant resource 5 according to the conventional first come first service rule only after the access network device sends the uplink grant resource 1, the uplink grant resource 2, the uplink grant resource 3, and the uplink grant resource 4, thereby reducing a scheduling latency of the uplink grant resource 5.

It may be understood that, if the BSR 2 also carries first indication information, and a scheduling mode determined by the access network device according to the first indication information is also the scheduling mode 2, after allocating the uplink grant resource 5, the access network device needs to preferentially send the uplink grant resource 2 and the uplink grant resource 5, and then sequentially send the uplink grant resource 1, the uplink grant resource 3, and the uplink grant resource 4.

For example, the access network device may first send the uplink grant resource 2, and then send the uplink grant resource 5 in an allocation order of the uplink grant resource 2 and the uplink grant resource 5.

Optionally, the access network device may send the uplink grant resource 2 and the uplink grant resource 5 in a priority level order of a logical channel 5 and a logical channel 2. For example, if a priority level of the logical channel 2 is higher than a priority level of the logical channel 5, the access network device may first send the uplink grant resource 2, and then send the uplink grant resource 5.

Optionally, the access network device may send the uplink grant resource 2 and the uplink grant resource 5 in a priority level order of a service bound to the logical channel 5 and a service bound to the logical channel 2.

It should be noted that, in the scheduling mode 2, the access network device can preferentially send the first uplink grant resource, thereby reducing a scheduling latency of the first uplink grant resource, thereby meeting a low-latency scheduling requirement of the to-be-sent data on the first logical channel.

If a scheduling mode determined by the access network device according to the first indication information carried in the BSR 5 is the scheduling mode 3, after receiving the BSR 5, the access network device arranges the BSR 5 in front of the BSR 2, the BSR 3, and the BSR 4, and preferentially allocates the uplink grant resource 5 based on the BSR 5 in the scheduling mode 3. In addition, after the uplink grant resource 5 is allocated, if the uplink grant resource 1 that is already allocated is still in a state of waiting to be sent by the access network device, the access network device may arrange the uplink grant resource 5 in front of the uplink grant resource 1, and preferentially send the uplink grant resource 5. The uplink grant resource 5 does not need to queue up to be allocated by the access network device, and after being allocated, the uplink grant resource 5 does not need to queue up to be sent by the access network device, thereby reducing a latency of scheduling the uplink grant resource 5 by the access network device.

It should be noted that, the scheduling mode 3 is a combination of the scheduling mode 1 and the scheduling mode 2. In the scheduling mode 3, in a process of scheduling a corresponding uplink grant resource based on each BSR, the access network device can preferentially allocate and preferentially send the first uplink grant resource, to reduce a scheduling latency of the first uplink grant resource, thereby meeting a low-latency scheduling requirement of the to-be-sent data on the first logical channel.

Example 2: When the BSR is a BSR corresponding to an LCG to which the first logical channel belongs, the BSR indicates a total data volume of to-be-sent uplink data on the LCG, where the uplink data includes the to-be-sent data on the first logical channel. For example, in Example 2, the access network device may schedule the first uplink grant resource in any one of the following three scheduling modes:

Scheduling mode 4: The access network device preferentially allocates a second transmission resource to the uplink data based on the BSR, and sends the second uplink grant resource to the terminal device.

Scheduling mode 5: The access network device allocates a second uplink grant resource to the uplink data based on the BSR, and preferentially sends the second uplink grant resource to the terminal device.

Scheduling mode 6: The access network device preferentially allocates a second uplink grant resource to the uplink data based on the BSR, and preferentially sends the second uplink grant resource to the terminal device.

A specific manner in which the access network device preferentially allocates the second transmission resource to the uplink data based on the BSR, and sends the second uplink grant resource to the terminal device in the scheduling mode 4 is the same as a specific manner in which the access network device preferentially allocates the first uplink grant resource to the to-be-sent data on the first logical channel based on the BSR, and sends the first uplink grant resource to the terminal device in the scheduling mode 1 in Example 1.

A specific manner in which the access network device allocates the second transmission resource to the uplink data based on the BSR, and preferentially sends the second uplink grant resource to the terminal device in the scheduling mode 5 is the same as a specific manner in which the access network device allocates the first uplink grant resource to the to-be-sent data on the first logical channel based on the BSR, and preferentially sends the first uplink grant resource to the terminal device in the scheduling mode 2 in Example 1.

A specific manner in which the access network device preferentially allocates the second transmission resource to the uplink data based on the BSR, and preferentially sends the second uplink grant resource to the terminal device in the scheduling mode 6 is the same as a specific manner in which the access network device preferentially allocates the first uplink grant resource to the to-be-sent data on the first logical channel based on the BSR, and preferentially sends the first uplink grant resource to the terminal device in the scheduling mode 3 in Example 1.

Therefore, for specific implementations of the scheduling mode 4, the scheduling mode 5, and the scheduling mode 6 in Example 2, refer to related descriptions of the scheduling mode 1, the scheduling mode 2, and the scheduling mode 3 in Example 1. Details are not described herein again.

It should be noted that, in Example 2, the access network device schedules the second uplink grant resource based on the BSR in the scheduling mode corresponding to the first logical channel. The second uplink grant resource is a total resource required for the total data volume of the uplink data, that is, the second uplink grant resource includes the first uplink grant resource.

Therefore, after the access network device sends the second uplink grant resource to the terminal device, step 403 may specifically include determining, by the terminal device, the first uplink grant resource in the second uplink grant resource, and sending the to-be-sent data on the first logical channel to the access network device by using the first uplink grant resource.

The terminal device may determine the first uplink grant resource in the second uplink grant resource in a plurality of manners. For example, in conventional manners, the first uplink grant resource may be determined in the second uplink grant resource based on a data volume of the to-be-sent data on the first logical channel and a priority level of the to-be-sent data, or the first uplink grant resource is determined in the second uplink grant resource according to an uplink channel multiplexing policy preset in the terminal device. This is not limited in this application.

In Example 3, when the BSR is a BSR corresponding to an LCG to which the first logical channel belongs, compared with Example 2, the terminal device may further add data volume information of the to-be-sent data on the first logical channel to the BSR. The access network device may separately schedule the first uplink grant resource required by a data volume of the to-be-sent data on the first logical channel and an uplink grant resource required by a data volume of to-be-sent data on a logical channel, in the LCG, other than the first logical channel, to meet a low-latency scheduling requirement of the to-be-sent data on the first logical channel.

For example, in Example 3, the access network device may schedule the first uplink grant resource in any one of the following three scheduling modes.

Scheduling mode 7: The access network device preferentially allocates the first uplink grant resource to the to-be-sent data individually based on the data volume of the to-be-sent data, and sends the first uplink grant resource to the terminal device.

Scheduling mode 8: The access network device individually allocates the first uplink grant resource to the to-be-sent data based on the data volume of the to-be-sent data, and preferentially sends the first uplink grant resource to the terminal device.

Scheduling mode 9: The access network device preferentially allocates the first uplink grant resource to the to-be-sent data individually based on the data volume of the to-be-sent data, and preferentially sends the first uplink grant resource to the terminal device.

For example, assuming that a BSR 9 is the BSR sent by the terminal device and carrying the first indication information, before receiving the BSR 9, the access network device already sequentially receives a BSR 6, a BSR 7, and a BSR 8 in a chronological order, the access network device already allocates an uplink grant resource 6 based on the BSR 6, and the BSR 7 and the BSR 8 are in a state of queuing up to be processed by the access network device. A logical channel indicated by the first indication information is a logical channel 91, and the BSR 9 further carries information about a data volume (assumed to be a data volume 91) of to-be-sent data on the logical channel 91. An uplink grant resource required by the data volume 91 is an uplink grant resource 91. An uplink grant resource required by a data volume 92 of to-be-sent data on a logical channel, in an LCG corresponding to the BSR 9, other than the logical channel 91 is an uplink grant resource 92.

If a scheduling mode determined by the access network device according to the first indication information carried in the BSR 9 is the scheduling mode 7, after the access network device receives the BSR 9, the access network device may preferentially allocate the uplink grant resource 91 individually based on the data volume 91 in the scheduling mode 7, and then sequentially allocate an uplink grant resource 7, an uplink grant resource 8, and an uplink grant resource 92 based on the BSR 7, the BSR 8, and the data volume 92 and in an order of receiving the BSR 7, the BSR 8, and the BSR 9 by the access network device, instead of arranging the uplink grant resource 91 and the uplink grant resource 92 together behind the uplink grant resource 7 and the uplink grant resource 8 according to a conventional first come first service rule for waiting to be processed by the access network device, thereby reducing a latency of scheduling the uplink grant resource 91 by the access network device, and meeting a low-latency scheduling requirement of to-be-sent data on the logical channel 91.

After the uplink grant resource 91 is allocated, if the uplink grant resource 6 that is already allocated is still in a state of waiting to be sent by the access network device, the access network device may arrange the uplink grant resource 91 behind the uplink grant resource 6 according to the conventional first come first service rule for waiting to be sent by the access network device, and after sending the uplink grant resource 6, individually send the uplink grant resource 91 to the terminal device.

It may be understood that, if the BSR 7 also carries first indication information, and information about a data volume (assumed to be a data volume 71) of to-be-sent data on a logical channel 71 that is indicated by the first indication information, a scheduling mode determined by the access network device according to the first indication information carried in the BSR 7 is also the scheduling mode 7. The access network device needs to preferentially allocate an uplink grant resource 71 required by the data volume 71 and the uplink grant resource 91, and then sequentially allocate an uplink grant resource 72 required by a data volume 72 of to-be-sent data on a logical channel, in an LCG corresponding to the BSR 7, other than the logical channel 71, the uplink grant resource 8, and the uplink grant resource 92.

For example, the access network device may first allocate the uplink grant resource 71, and then allocate the uplink grant resource 92 in a receiving order of the BSR 7 and the BSR 9.

Optionally, the access network device may allocate the uplink grant resource 71 and the uplink grant resource 91 in a priority level order of the logical channel 71 and the logical channel 91. For example, if a priority level of the logical channel 91 is higher than a priority level of the logical channel 71, the access network device may first allocate the uplink grant resource 91, and then allocate the uplink grant resource 71.

Optionally, the access network device may allocate the uplink grant resource 91 and the uplink grant resource 71 in a priority level order of a service bound to the logical channel 91 and a service bound to the logical channel 71.

It should be noted that, in the scheduling mode 7, the access network device can separately schedule the first uplink grant resource required by the data volume of the to-be-sent data on the first logical channel in the LCG and an uplink grant resource required by a data volume of to-be-sent data on another logical channel, and preferentially allocate the first uplink grant resource, thereby reducing a scheduling latency of the first grant resource, and meeting a low-latency scheduling requirement on the to-be-sent data on the first logical channel.

If a scheduling mode determined by the access network device according to the first indication information carried in the BSR 9 is the scheduling mode 8, after receiving the BSR 9, the access network device may respectively allocate an uplink grant resource 7 and an uplink grant resource 8 based on the BSR 7 and the BSR 8 in the scheduling mode 8, and then individually allocate the uplink grant resource 91 based on the data volume 91, and allocate the uplink grant resource 92 based on the data volume 92.

After the uplink grant resource 91 and the uplink grant resource 92 are allocated, if the uplink grant resource 6, the uplink grant resource 7, and the uplink grant resource 8 are still in a state of waiting to be sent by the access network device, the access network device may arrange the uplink grant resource 91 in front of the uplink grant resource 6, the uplink grant resource 7, and the uplink grant resource 8, and preferentially send the uplink grant resource 91, instead of sending the uplink grant resource 91 and the uplink grant resource 92 according to a conventional first come first service rule only after the access network device sends the uplink grant resource 6, the uplink grant resource 7, and the uplink grant resource 8, thereby reducing a scheduling latency of the uplink grant resource 91, and meeting a low-latency scheduling requirement of the to-be-sent data on the logical channel 91.

It may be understood that, if the BSR 7 also carries first indication information and a data volume 71, a scheduling mode determined by the access network device according to the first indication information carried in the BSR 7 is also the scheduling mode 8. After individually allocating the uplink grant resource 71 and the uplink grant resource 91, the access network device needs to preferentially send the uplink grant resource 71 and the uplink grant resource 91, and then send the uplink grant resource 6, the uplink grant resource 72, the uplink grant resource 8, and the uplink grant resource 92.

For example, the access network device may first send the uplink grant resource 71 and then send the uplink grant resource 91 in an allocation order of the uplink grant resource 71 and the uplink grant resource 91.

Optionally, the access network device may send the uplink grant resource 71 and the uplink grant resource 91 in a priority level order of a logical channel 71 and the logical channel 91. For example, if a priority level of the logical channel 91 is higher than a priority level of the logical channel 71, the access network device may first send the uplink grant resource 91, and then send the uplink grant resource 71.

Optionally, the access network device may send the uplink grant resource 71 and the uplink grant resource 91 in a priority level order of a service bound to the logical channel 91 and a service bound to the logical channel 71.

It should be noted that, in the scheduling mode 8, the access network device can separately schedule the first uplink grant resource required by the data volume of the to-be-sent data on the first logical channel in the LCG and an uplink grant resource required by a data volume of to-be-sent data on another logical channel, and preferentially send the first uplink grant resource, thereby reducing a scheduling latency of the first grant resource, and meeting a low-latency scheduling requirement on the to-be-sent data on the first logical channel.

If a scheduling mode determined by the access network device according to the first indication information carried in the BSR 9 is the scheduling mode 9, after receiving the BSR 9, the access network device may preferentially allocate the uplink grant resource 91 individually based on the data volume 91 in the scheduling mode 9. In addition, after the uplink grant resource 91 is allocated, if the uplink grant resource 6 is still in a state of waiting to be sent by the access network device, the access network device may arrange the uplink grant resource 91 in front of the uplink grant resource 6, and preferentially sends the uplink grant resource 91. That is, the access network device neither needs to allocate the uplink grant resource 91 in a receiving order of the BSR 7, the BSR 8, and the BSR 9 after allocating the uplink grant resource 7 and the uplink grant resource 8, nor needs to arrange the uplink grant resource 91 behind the uplink grant resource 6 for sending, thereby reducing a latency of scheduling the uplink grant resource 91 by the access network device, and meeting a low-latency scheduling requirement of the to-be-sent data on the logical channel 91.

It should be noted that, the scheduling mode 9 is a combination of the scheduling mode 7 and the scheduling mode 8. In the scheduling mode 9, the access network device can separately schedule the first uplink grant resource required by the data volume of the to-be-sent data on the first logical channel in the LCG and an uplink grant resource required by a data volume of to-be-sent data on another logical channel, and preferentially allocate and preferentially send the first uplink grant resource, to reduce a scheduling latency of the first uplink grant resource, thereby meeting a low-latency scheduling requirement of the to-be-sent data on the first logical channel.

It may be understood that, in Example 3, although the terminal device sends the BSR based on the LCG, because the access network device can individually schedule the first uplink grant resource required by the to-be-sent data on the first logical channel in the LCG, compared with Example 2, the terminal device does not need to determine the first uplink grant resource allocated to the LCG, thereby further reducing a latency of obtaining the first uplink grant resource by the terminal device. Compared with Example 1, the terminal device can also individually obtain the first uplink grant resource, without individually sending the BSR corresponding to the first logical channel to the access network device, thereby reducing network overheads.

Figure 5:
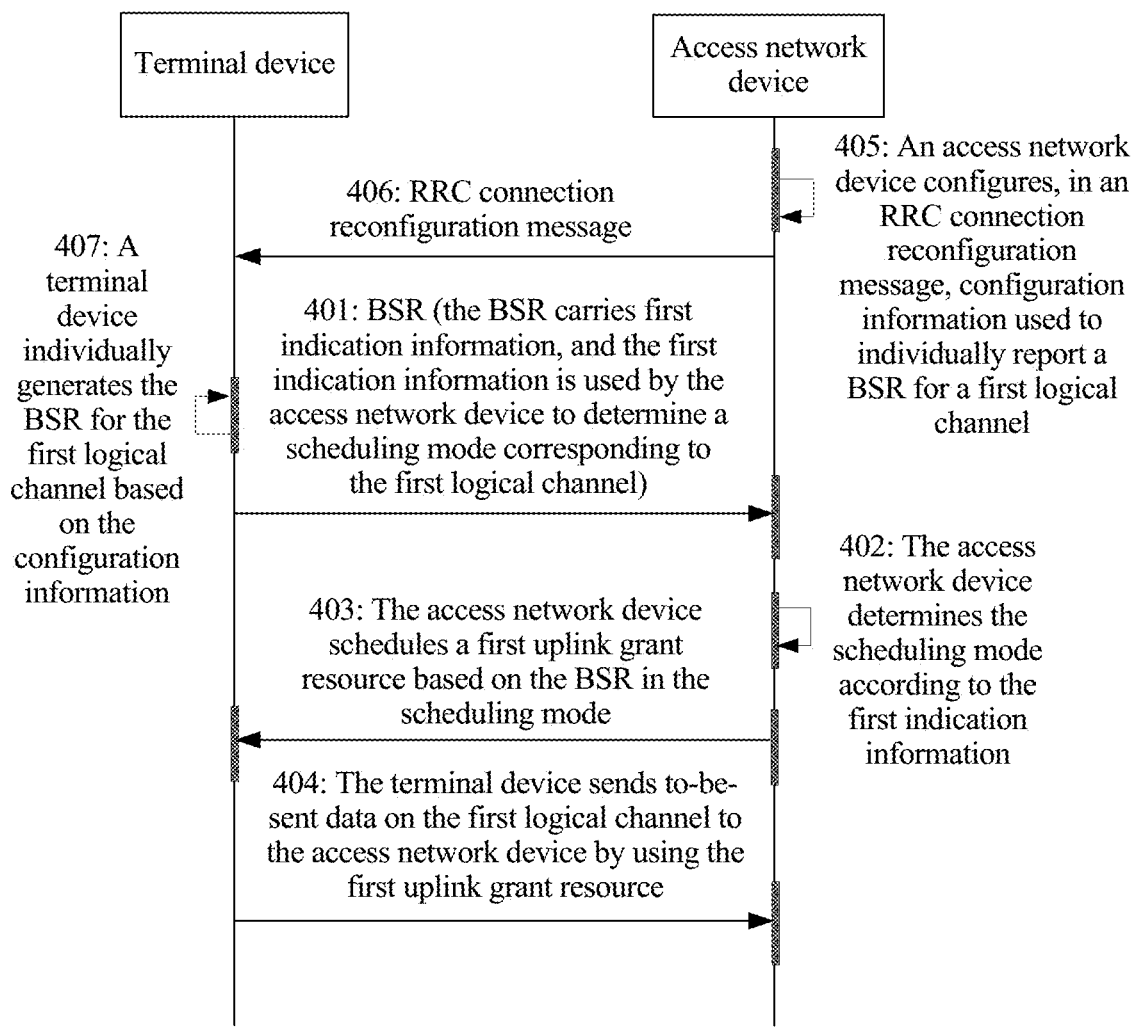
FIG. 5 is a schematic structural diagram of another embodiment of a resource scheduling method according to this application.

Further, in a scenario in which the terminal device reports the BSR based on the first logical channel, the terminal device needs to learn whether the first logical channel supports a function of individually reporting the BSR. With reference to FIG. 4 and FIG. 5, before step 401, the method may further include the following steps.

Step 405: The access network device configures, in an RRC connection reconfiguration message, configuration information used to individually report the BSR for the first logical channel.

In this application, the access network device may add an information element (IE) to the RRC connection reconfiguration message, to configure the configuration information used to individually report the BSR for the first logical channel. The configuration information may include indication information for instructing to individually report the BSR for the first logical channel, format information of the BSR individually corresponding to the first logical channel, or the like.

Step 406: The access network device sends the RRC connection reconfiguration message to the terminal device.

Step 407: The terminal device individually generates the BSR for the first logical channel based on the configuration information.

After receiving the RRC connection reconfiguration message, the terminal device can determine, based on the configuration information, that the first logical channel is a logical channel supporting the function of individually reporting the BSR. Therefore, after the BSR is triggered, the terminal device can individually generate the BSR for the first logical channel based on the configuration information, and send the BSR to the access network device.

Optionally, in another embodiment of the resource scheduling method provided in this application, the terminal device does not directly add the first indication information to the BSR, but uses a transmission resource location of sending the BSR, as the first indication information, to instruct the access network device to determine the scheduling mode corresponding to the first logical channel.

That is, the access network device may send a mapping relationship between the first logical channel and the transmission resource location to the terminal device in advance. When the terminal device needs to send the BSR corresponding to the first logical channel, or send the BSR corresponding to the LCG to which the first logical channel belongs, the terminal device can send the BSR at the transmission resource location having the mapping relationship with the first logical channel. Therefore, when receiving the BSR at the transmission resource location, the access network device can determine the scheduling mode corresponding to the first logical channel. Further, the access network device can schedule the first uplink grant resource based on the BSR in the scheduling mode corresponding to the first indication information (namely, the transmission resource location).

It can be learned from the foregoing embodiment that, the terminal device adds the first indication information to the BSR, to instruct the access network device to determine the scheduling mode corresponding to the first logical channel. Therefore, after receiving the BSR, the access network device schedules, in the scheduling mode corresponding to the first logical channel, the first uplink grant resource required by the to-be-sent data on the first logical channel, to differentially schedule the first uplink grant resource required by the to-be-sent data on the first logical channel, thereby meeting a scheduling requirement of the to-be-sent data.

The solutions provided in this application are described above mainly from a perspective of interaction between network elements. It may be understood that, to implement the foregoing functions, the network elements, such as the terminal device and the access network device, include corresponding hardware structures and/or software modules for performing the functions. A person of ordinary skill in the art should easily be aware that, in combination with units and algorithms steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the terminal device, the access network device, or the like may be divided into functional modules according to the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in this application, module division is an example, and is merely logical function division. During actual implementation, another division manner may be used.

Figure 6A:
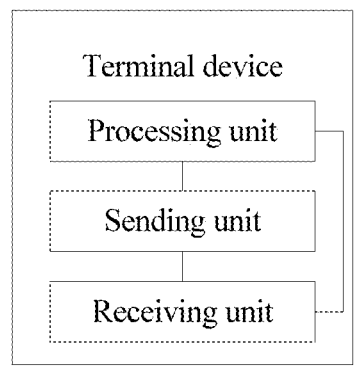
FIG. 6A is a second schematic structural diagram of a terminal device according to this application.

When functional modules are obtained through division based on corresponding functions, FIG. 6A is a possible schematic structural diagram of the terminal device in the foregoing embodiment. The terminal device includes a processing unit, a sending unit, and a receiving unit. The processing unit is configured to support the terminal device in performing the process 407 in FIG. 5, the sending unit is configured to support the terminal device in performing the processes 401 and 404 in FIG. 4 and FIG. 5, and the receiving unit is configured to support the terminal device in performing the process 403 in FIG. 4, and the processes 403 and 406 in FIG. 5. All related content of the steps in the method embodiment may be cited in function descriptions of corresponding functional modules, and details are not described herein again.

Figure 6B:
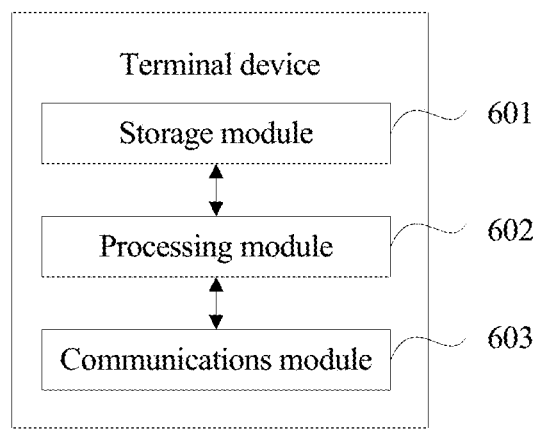
FIG. 6B is a third schematic structural diagram of a terminal device according to this application.

When an integrated unit is used, FIG. 6B is a possible schematic structural diagram of the terminal device in the foregoing embodiment. The terminal device includes a processing module 602 and a communications module 603. The processing module 602 is configured to control and manage an action of the terminal device. For example, the processing module 602 is configured to support the terminal device in performing the processes 401, 403, and 404 in FIG. 4, and the processes 401, 403, 404, 406, and 407 in FIG. 5, and/or another process used for the technology described in this specification. The communications module 603 is configured to support the terminal device in communicating with another network entity, for example, communicating with the functional module or the network entity shown in FIG. 1. The terminal device may further include a storage module 601, configured to store program code and data of the terminal device.

The processing module 602 may be a processor or a controller, such as a central processing unit (CPU), a general-purpose processor, a digital signal processor (DSP), an application-specific integrated circuit (ASIC), a field programmable gate array (FPGA) or another programmable logical device, a transistor logical device, a hardware component, or a combination thereof. The processor or the controller may implement or execute various example logical blocks, modules, and circuits described with reference to the content disclosed in this application. Alternatively, the processor may be a combination for implementing a computing function, for example, a combination of one or more microprocessors, or a combination of the DSP and a microprocessor. The communications module 603 may be a transceiver, a transceiver circuit, a communications interface, or the like. The storage module 601 may be a memory.

Figure 6C:
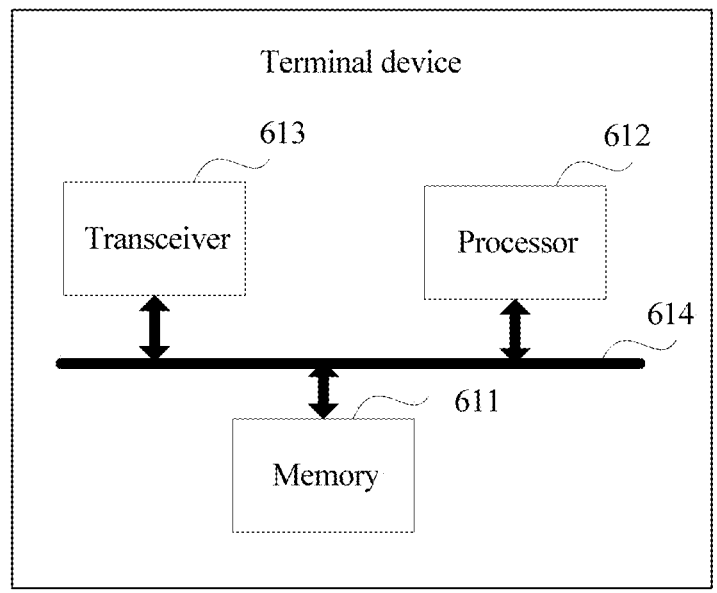
FIG. 6C is a fourth schematic structural diagram of a terminal device according to this application.

When the processing module 602 is a processor, the communications module 603 is a transceiver, and the storage module 601 is a memory, the terminal device in this application may be a terminal device shown in FIG. 6C.

Referring to FIG. 6C, the terminal device includes a processor 612, a transceiver 613, a memory 611, and a bus 614. The transceiver 613, the processor 612, and the memory 611 are connected to each other by using the bus 614, and the bus 614 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6C, but this does not mean that there is only one bus or only one type of bus.

Figure 7A:
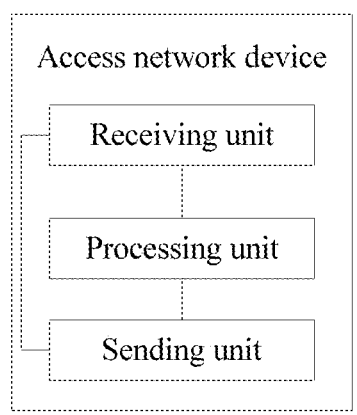
FIG. 7A is a second schematic structural diagram of an access network device according to this application.

When functional modules are obtained through division based on corresponding functions, FIG. 7A is a possible schematic structural diagram of the access network device in the foregoing embodiment. The access network device includes a sending unit, a processing unit, and a receiving unit. The sending unit is configured to support the access network device in performing the process 406 in FIG. 5, the processing unit is configured to support the access network device in performing the processes 402 and 403 in FIG. 4 and the processes 402, 403, and 405 in FIG. 5, and the receiving unit is configured to support the access network device in performing the processes 401 and 404 in FIG. 4 and FIG. 5. All related content of the steps in the method embodiment may be cited in function descriptions of corresponding functional modules, and details are not described herein again.

Figure 7B:
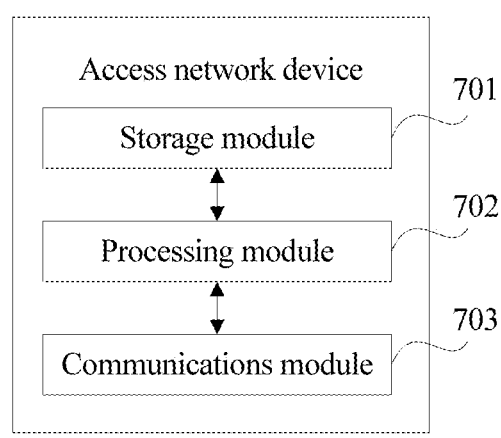
FIG. 7B is a third schematic structural diagram of an access network device according to this application.

When an integrated unit is used, FIG. 7B is a possible schematic structural diagram of the access network device in the foregoing embodiment. The access network device includes a processing module 702 and a communications module 703. The processing module 702 is configured to control and manage an action of the access network device. For example, the processing module 702 is configured to support the access network device in performing the processes 401, 402, 403, and 404 in FIG. 4, the processes 401, 402, 403, 404, 405, and 406 in FIG. 5, and/or another process used for the technology described in this specification. The communications module 703 is configured to support the access network device in communicating with another network entity, for example, communicating with the functional module or the network entity shown in FIG. 1. The access network device may further include a storage module 701, configured to store program code and data of the access network device.

The processing module 702 may be a processor or a controller, for example, may be a CPU, a general purpose processor, a DSP, an ASIC, an FPGA, or another programmable logic device, a transistor logic device, a hardware component, or any combination thereof. The processor or the controller may implement or execute various example logical blocks, modules, and circuits described with reference to the content disclosed in this application. Alternatively, the processor may be a combination for implementing a computing function, for example, a combination of one or more microprocessors, or a combination of the DSP and a microprocessor. The communications module 703 may be a transceiver, a transceiver circuit, a communications interface, or the like. The storage module 701 may be a memory.

Figure 7C:
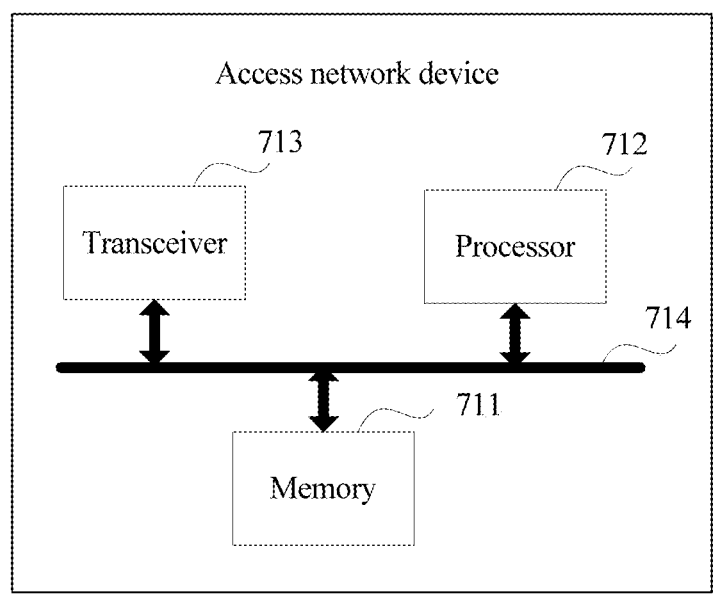
FIG. 7C is a fourth schematic structural diagram of an access network device according to this application.

When the processing module 702 is a processor, the communications module 703 is a transceiver, and the storage module 701 is a memory, the access network device in this application may be an access network device shown in FIG. 7C.

Referring to FIG. 7C, the access network device includes a processor 712, a transceiver 713, a memory 711, and a bus 714. The transceiver 713, the processor 712, and the memory 711 are connected to each other by using the bus 714, and the bus 714 may be a PCI bus, an EISA bus, or the like. The bus may be classified into an address bus, a data bus, a control bus, and the like. For ease of representation, only one thick line is used to represent the bus in FIG. 7C, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (random access memory, RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

During specific implementation, the present invention further provides a computer storage medium, where the computer storage medium may store a program, and when the program is executed, some or all of the steps of the embodiments of the resource scheduling method provided in the present invention may be performed. The storage medium may be a magnetic disk, an optical disc, a read-only memory (ROM), a random access memory (RAM), or the like.

As shown in FIG. 1, this application further provides a communications system, including the terminal device shown in FIG. 6A, FIG. 6B, or FIG. 6C, and the access network device in FIG. 7A, FIG. 7B, or FIG. 7C.

A person skilled in the art may clearly understand that, the technologies in this application may be implemented by software in addition to a necessary general hardware platform. Based on such an understanding, the technical solutions of this application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, an access network device, or the like) to perform the methods described in the embodiments or in some parts of the embodiments of the present invention.

For same or similar parts of the embodiments in this specification, refer to each other. Especially, the apparatus embodiment is basically similar to the method embodiment, and therefore is described briefly; and for related parts, refer to descriptions in the method embodiment.

The foregoing descriptions are implementations of the present invention, but are not intended to limit the protection scope of the present invention.

What is claimed is:

1. A method, comprising:
sending, by a terminal device, a buffer status report (BSR) to an access network device, wherein the BSR carries first indication information, and the first indication information is used by the access network device to determine a scheduling mode corresponding to a first logical channel, and wherein the BSR corresponds to the first logical channel;
receiving, by the terminal device, a first uplink grant resource sent by the access network device, wherein the first uplink grant resource is scheduled by the access network device based on the BSR in the scheduling mode;
sending, by the terminal device using the first uplink grant resource, to-be-sent data on the first logical channel to the access network device; and
performing, before sending the BSR to the access network device:
receiving, by the terminal device, a radio resource control (RRC) connection reconfiguration message sent by the access network device, wherein the RRC connection reconfiguration message comprises configuration information used to individually report the BSR corresponding to the first logical channel; and
individually generating, by the terminal device, the BSR corresponding to the first logical channel based on the configuration information.

2. The method according to claim 1, wherein the first indication information comprises priority information of the first logical channel.

3. The method according to claim 1, wherein before sending, by the terminal device, the BSR to the access network device, the method further comprises:
receiving, by the terminal device from the access network device, information of a mapping relationship between transmission characteristic information and the first logical channel, wherein the mapping relationship is used to configure a transmission characteristic corresponding to the first logical channel; and
wherein the first indication information comprises the transmission characteristic information.

4. The method according to claim 3, wherein the transmission characteristic information comprises a transmission time interval, a subcarrier spacing, or a cyclic prefix length.

5. The method according to claim 1, wherein the BSR corresponds to a logical channel group (LCG) to which the first logical channel belongs; and
wherein the BSR further carries data volume information of the to-be-sent data.

6. The method according to claim 5, wherein to-be-sent uplink data which belongs to the LCG comprises the to-be-sent data, and the data volume information is a ratio of the to-be-sent data to the to-be-sent uplink data which belongs to the LCG.

7. The method according to claim 1, wherein the BSR corresponds to a logical channel group (LCG) to which the first logical channel belongs, and receiving, by the terminal device, the first uplink grant resource sent by the access network device comprises:
receiving, by the terminal device, a second uplink grant resource sent by the access network device, wherein the second uplink grant resource is a total resource allocated by the access network device to to-be-sent uplink data which belongs to the LCG based on the BSR, the to-be-sent uplink data which belongs to the LCG comprises the to-be-sent data, and the second uplink grant resource comprises the first uplink grant resource; and
wherein sending, by the terminal device using the first uplink grant resource, the to-be-sent data to the access network device comprises:
determining, by the terminal device, the first uplink grant resource in the second uplink grant resource, and sending the to-be-sent data to the access network device using the first uplink grant resource.

8. A terminal device, comprising:
a processor; and
a computer-readable non-transitory storage medium storing a program to be executed by the processor, the program including instructions for:
generating a buffer status report (BSR), wherein the BSR carries first indication information, and the first indication information is used by an access network device to determine a scheduling mode corresponding to a first logical channel;
sending the BSR to the access network device, wherein the BSR corresponds to the first logical channel; and
receiving a first uplink grant resource sent by the access network device, wherein the first uplink grant resource is scheduled by the access network device based on the BSR in the scheduling mode; and
sending to-be-sent data on the first logical channel to the access network device using the first uplink grant resource;
performing, before sending the BSR to the access network device:
receiving a radio resource control (RRC) connection reconfiguration message sent by the access network device, wherein the RRC connection reconfiguration message comprises configuration information used to individually report the BSR corresponding to the first logical channel; and
individually generating the BSR corresponding to the first logical channel based on the configuration information.

9. The terminal device according to claim 8, wherein the first indication information comprises priority information of the first logical channel.

10. The terminal device according to claim 8, wherein the program further includes instructions for:
before sending the BSR to the access network device, receiving, from the access network device, information of a mapping relationship between transmission characteristic information and the first logical channel, wherein the mapping relationship is used to configure a transmission characteristic corresponding to the first logical channel; and wherein the first indication information comprises the transmission characteristic information.

11. The terminal device according to claim 10, wherein the transmission characteristic information comprises a transmission time interval, a subcarrier spacing, or a cyclic prefix length.

12. The terminal device according to claim 8, wherein the BSR corresponds to a logical channel group (LCG) to which the first logical channel belongs; and wherein the BSR further carries data volume information of the to-be-sent data.

13. The terminal device according to claim 12, wherein to-be-sent uplink data which belongs to the LCG comprises the to-be-sent data, and the data volume information is a ratio of the to-be-sent data to the to-be-sent uplink data which belongs to the LCG.

14. The terminal device according to claim 8, wherein the BSR corresponds to a logical channel group (LCG) to which the first logical channel belongs;

wherein receiving the first uplink grant resource sent by the access network device comprises:
receiving a second uplink grant resource sent by the access network device, wherein the second uplink grant resource is a total resource allocated by the access network device to to-be-sent uplink data which belongs to the LCG based on the BSR, the to-be-sent uplink data which belongs to the LCG comprises the to-be-sent data, and the second uplink grant resource comprises the first uplink grant resource; and
wherein sending the to-be-sent data to the access network device using the first uplink grant resource comprises:
determining the first uplink grant resource in the second uplink grant resource, and sending the to-be-sent data to the access network device by using the first uplink grant resource.

15. An access network device, comprising:
a receiver, configured to receive a buffer status report (BSR) sent by a terminal device, wherein the BSR carries first indication information, and wherein the BSR corresponds to a first logical channel; and
a processor; and
a computer-readable non-transitory storage medium storing a program to be executed by the processor, the program including instructions for:
determining, using the first indication information, a scheduling mode corresponding to a first logical channel;
scheduling a first uplink grant resource based on the BSR in the scheduling mode, wherein the first uplink grant resource is allocated for the terminal device to use to send to-be-sent data; and
performing, before receiving the BSR sent by the terminal device:
sending a radio resource control (RRC) connection reconfiguration message to the terminal device, wherein the RRC connection reconfiguration message comprises configuration information used to individually report the BSR corresponding to the first logical channel.

16. The access network device according to claim 15, wherein the first indication information comprises priority information of data on the first logical channel.

17. The access network device according to claim 15, wherein the program further includes instructions for:
before receiving the BSR sent by the terminal device, send information of a mapping relationship between transmission characteristic information and the first logical channel to the terminal device, wherein the mapping relationship is used to configure a transmission characteristic corresponding to the first logical channel; and
wherein the first indication information comprises the transmission characteristic information.

18. The access network device according to claim 17, wherein the transmission characteristic information comprises a transmission time interval, a subcarrier spacing, or a cyclic prefix length.

* * * * *